Figure 1:
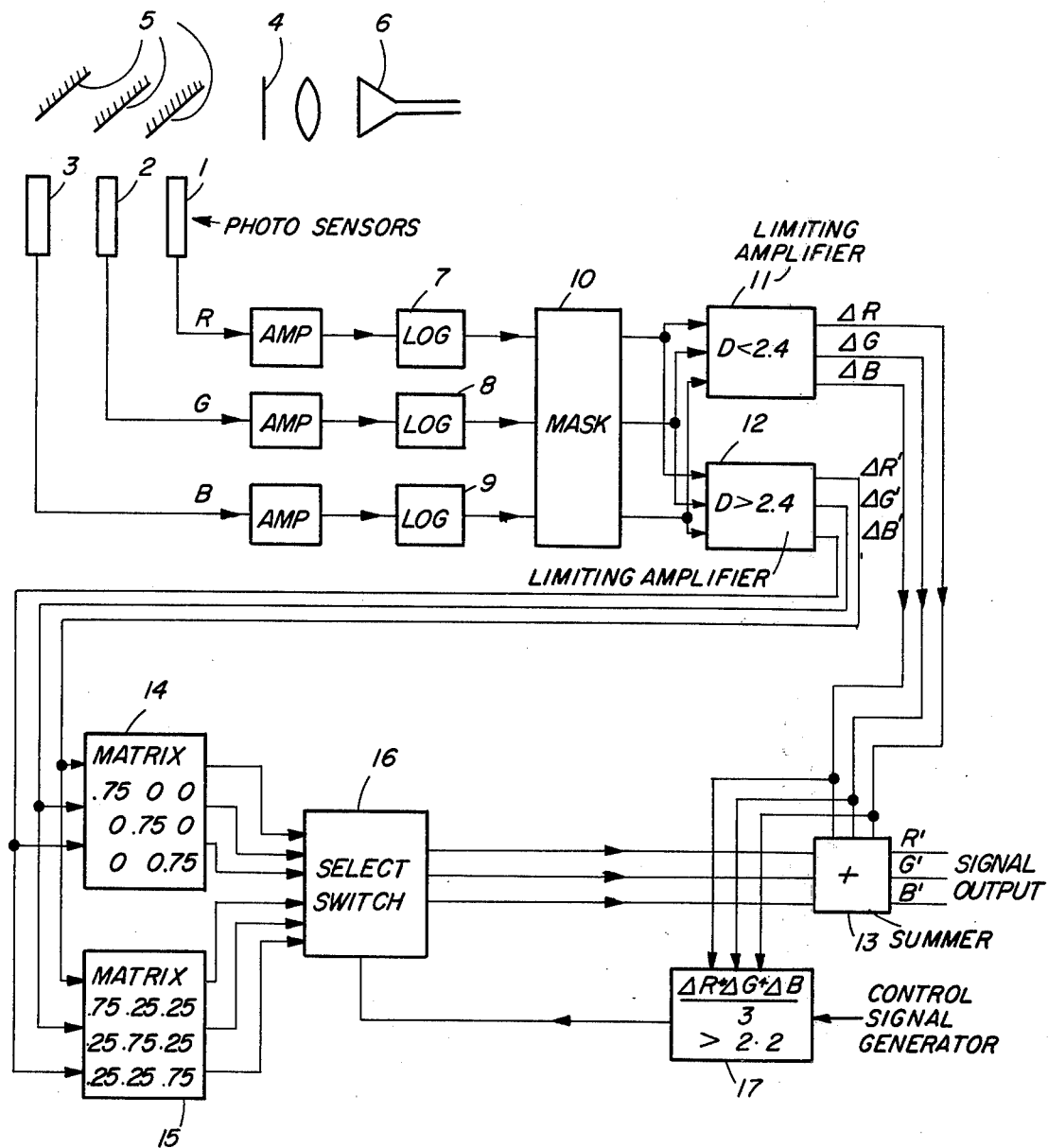

United States Patent [19]
Hailey et al.

[11] 4,160,264
[45] Jul. 3, 1979

[54] MATRIX COMPENSATOR FOR COLOR VIDEO SIGNALS

[75] Inventors: Keith R. Hailey, Watford; Michael Quinton, Abbots Langley, both of England

[73] Assignee: Eastman Kodak Company, Rochester, N.Y.

[21] Appl. No.: 812,931

[22] Filed: Jul. 1, 1977

[51] Int. Cl.² ........................ H04N 9/52; H04N 9/535
[52] U.S. Cl. ......................................... 358/29; 358/30
[58] Field of Search ............................. 358/30, 40, 29

[56] References Cited
U.S. PATENT DOCUMENTS

| 2,975,232 | 3/1961 | Breimer ................................. 358/29 |
| 3,588,827 | 6/1971 | Roessel et al. ..................... 358/30 X |

Primary Examiner—Robert L. Richardson
Attorney, Agent, or Firm—Thomas H. Close

[57] ABSTRACT

A video color signal compensator monitors, on a generally continuous basis the signal levels for three primary colors, and for certain operating zones introduces matrixing to drive the overall video signal toward neutral. Such matrixing, for example, is employed to diminish undesired hue effects in low light level areas of an image and to introduce detail in saturated image areas.

15 Claims, 2 Drawing Figures

MATRIX COMPENSATOR FOR COLOR VIDEO SIGNALS

BACKGROUND OF THE INVENTION

1. Field of the Invention

This invention relates to a compensation of color video signals for such problems as imager-to-display mismatch and imager response nonlinearities.

2. Description Relative to the Prior Art

Video signals representative of a picture or scene are produced, in the case of a television camera, by electronically scanning an image or images of the picture or scene, and processing the output signal(s) to the required form. Where a color video signal is required it is known to apply the output signals to a matrix unit to obtain color masking.

One difficulty encountered with electronic scanning systems, in television cameras and elsewhere, is that the signal/noise ratio is low when the picture or scene is badly lit or when the picture is very dense, and this can lead to degraded color reproduction for such areas when the video signal is used to form a display. Various techniques have been proposed to disable or "kill" the color operation (in favor of monochrome operation) when the chrominance component of a video signal is at a low level.

SUMMARY OF THE INVENTION

The present invention proposes to provide signal matrixing changes on a point-by-point basis. Such changes are made responsive to signal excursions corresponding to operation in heel and toe regions of imager response. By changing the matrixing to drive the video signal toward neutral in these regions it has been found that certain objectionable color shifts in shadow regions of an image can be mitigated or avoided and that detail can be introduced in saturated color areas where incremental imager response is diminished as a result of saturation. The invention in a sophistocated form provides for gradual matrix transitions.

In practicing the invention several auxilliary matrix units may be used and the switching of a selected auxilliary matrix unit onto operation and the switching out of another auxiliary matrix unit may be effected gradually in accordance with the density or saturation of the scanned picture point.

The invention will normally be used with television cameras and film scanners of the conventional kind in which red, green and blue density signals of the scanned picture point are available, but it is not limited to such colors or devices.

Figure 2:
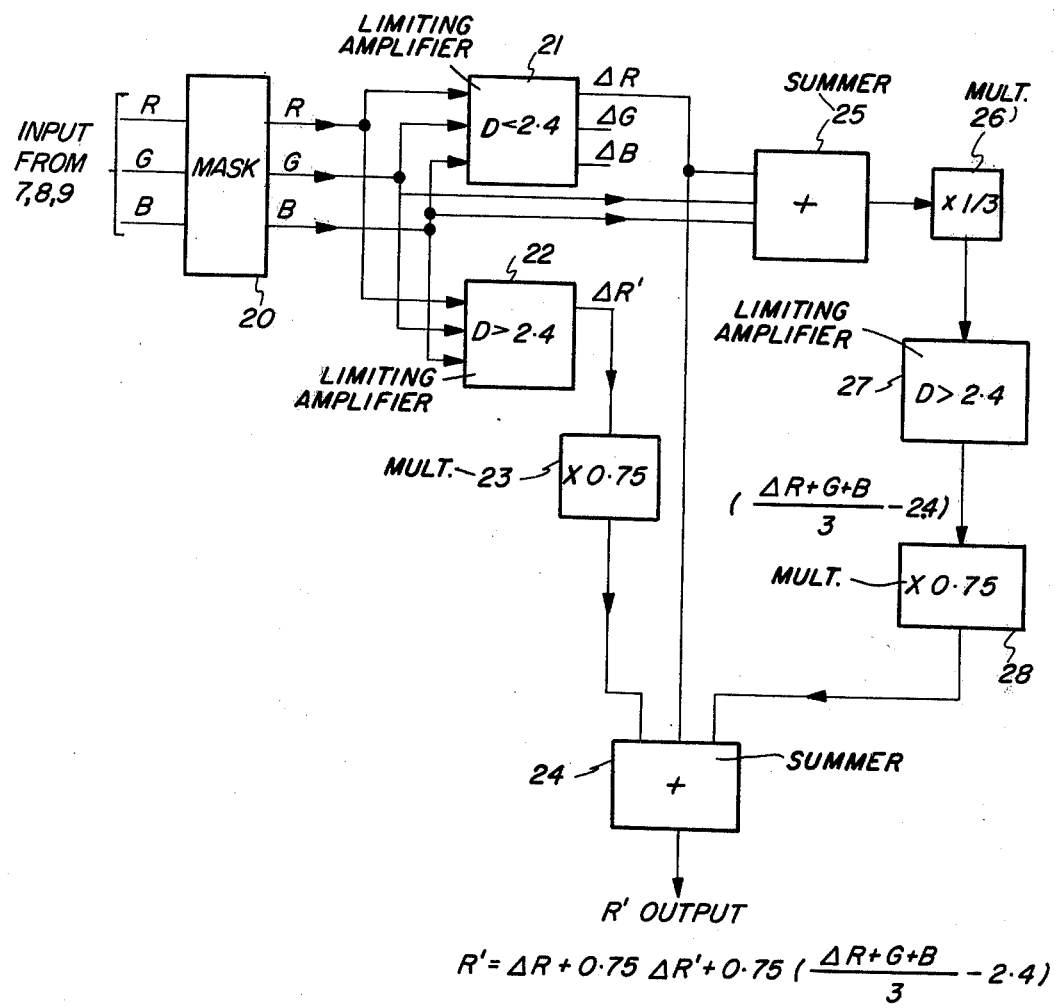

The invention may also be advantageously applied to an electronic film scanner in apparatus for producing a photographic print from a transparency, and two such applications will now be described by way of example with reference to the drawing in which FIG. 1 is a block diagram of the relevant portion of the first example of signal processing circuit for red, green and blue signals; and in which FIG. 2 is a block diagram of a fourth example of signal processing circuit, but for simplicity showing only the circuitry for the red signal.

Referring now to FIG. 1, there are shown three photomultipliers 1, 2 and 3 respectively sensitive to red, green and blue light reflected by a set of mirrors 5 as it leaves the transparency 4 during scanning at the usual television scanning rate by a flying spot scanner having a cathode ray tube. The resultant red, green and blue transmission signals are supplied to respective logarithmic amplifiers 7, 8 and 9 and the outputs thereof pass to a conventional electronic color mask 10 which provides matrixing to correct for sensor to display mismatch. The matrixed signals therefrom are applied to dividers (limiting amplifiers) 11 and 12 such that signals corresponding to a scanned picture point of a transparency having an optical density of less than a predetermined value appear in divider portion 11 and are applied to a summing amplifier 13 for the color video output signal (a set of analog switches which respond to the levels of the incoming signals may be used to implement the dividers 11 and 12). Matrixed signals corresponding to picture points whose transparency density is more than the predetermined value appear in divider portion 12 and are applied to auxiliary matrix units 14 and 15, and the output from these auxiliary matrix units is also applied to the summing amplifier 13, the composition of these outputs being controlled by a selector switch 16 which is responsive to a control signal derived by a control signal generator 17. The control signal generator operates when the magnitude of the signal for the scanned picture point reaches a selected value.

The predetermined signal value referred to above in connection with the dividers 11 and 12 has been chosen to correspond to an optical density for a transparency of 2.4 since this is the greatest optical density expected from a normally exposed transparency or slide. A different value could be chosen, if necessary, where the invention is applied to a television camera, i.e. operates on signals resulting from direct scene image to video signal conversions.

In this embodiment the second auxiliary matrix unit is used to modify the color video output signal in such a way as to neutralize shadow areas of a print made from the transparency using the color video output signal to reconstitute the picture in known manner and this compensation is effected selectively to avoid degrading saturated colors. For this purpose the matrix unit 15 with all positive terms combines the signals which are applied thereto (i.e. the signals corresponding to high densities), so as to make the picture point more neutral. Where the scanned point is a saturated color then desaturation of the picture point is not desired and the required output will be derived from matrix unit 14 which is a unity matrix in this embodiment.

A preferred threshhold condition for triggering switching in this arrangement, using selector switch 16, is when the red, green and blue densities all rise above 1.8. This point may be determined by means of a circuit which can make the three comparisons necessary and actuate the selector switch 16, e.g. three comparators and an AND gate. In practice, however, it is preferred to use a simplified circuit that produces a control signal which is the average of the lower parts of the red, green and blue density signals, that is, the average of the output of the divider 11. Switching then takes place at a density of 2.2, although in practice, to avoid contouring effects it is preferred that the switching between the matrix units 14 and 15 is gradual, beginning at a density of 2.0 and being complete at a density of 2.4. Thus, if the scanned picture point is a red having densities $R<1.8$, $G>2.4$, $B>2.4$ then the control signal is less than 2.2, the unity matrix 14 remains operative and the saturation is maintained. A near-neutral picture point with $R>2.4$, $G>2.4$, $B>2.4$ will however cause the desaturating matrix unit 15 to be switched in, and the color of the resultant picture will be made more nearly neutral by the matrixing operation in unit 15.

The specific system may be summarized in matrix terms as follows where R', G', and B' are the red, green and blue output signals from the summer 13; ΔR, ΔG and ΔB are the lower parts of the divided density signals (from divider 11); and ΔR', ΔG' and ΔB' are the upper parts of the divided density signals (from divider 12).

$$\begin{bmatrix} R' \\ G' \\ B' \end{bmatrix} = \begin{bmatrix} \Delta R \\ \Delta G \\ \Delta B \end{bmatrix} + [M] \begin{bmatrix} \Delta R' \\ \Delta G' \\ \Delta B' \end{bmatrix}$$

where $[M] = \begin{bmatrix} 1 & 0 & 0 \\ 0 & 1 & 0 \\ 0 & 0 & 1 \end{bmatrix}$ if $\frac{\Delta R + \Delta G + \Delta B}{3} < 2.2$ and $[M] = \begin{bmatrix} .50 & .25 & .25 \\ .25 & .50 & .25 \\ .25 & .25 & .50 \end{bmatrix}$ if $\frac{\Delta R + \Delta G + \Delta B}{3} \geq 2.2$ A simplification of this specific system, resulting in what will be called the second embodiment is possible if a comprise term value of 0.75 is adopted for the diagonal terms of both the matrix 14 and the desaturating matrix 15 (as shown in FIG. 1). Switching of the off-diagonal terms only of these matrices is then necessary in changing over from one matrix unit to the other. In this case the matrix 14 is not a unity matrix.

Improved color reproduction in prints made from transparencies using a color video output signal modified by the above techniques has been noted.

The technique described above can be changed to modify the color video output signal so as *to add detail in saturated color areas* of a print from a transparency. This is effective for example where there is some red information in the transparency in the form of modulation of the small amount of cyan dye, and where this corresponds to a point off the toe of the characteristic curve of the printing paper emulsion (or sensor response). This may be compensated for in the third embodiment by introducing some weak matrixing into the red channel of matrix 14 of FIG. 1. Thus the same general arrangement is adopted as above but the matrices are modified as follows:

$$[M] = \begin{bmatrix} .75 & .06 & .06 \\ 0 & .75 & 0 \\ 0 & 0 & .75 \end{bmatrix} \text{ if } \frac{\Delta R + \Delta G + \Delta B}{3} < 2.2$$

$$= \begin{bmatrix} .75 & .25 & .25 \\ .25 & .75 & .25 \\ .25 & .25 & .75 \end{bmatrix} \text{ if } \frac{\Delta R + \Delta G + \Delta B}{3} \geq 2.2$$

The value of 0.06 was found by experiment to give an acceptable amount of detail to reds (with G=B<2.4) without adding too much 'wrong' information from the green and blue channels, and without causing yellows (with B<2.4) to be reproduced too green.

Dark neutrals are not affected by the imbalance of the row sums in the first matrix, because they are handled by the second matrix 15.

A fourth embodiment will now be described with reference to FIG. 2 of the drawings. Bearing in mind that this block diagram is concerned mainly with the red channel of the signal processing circuit it will be seen that it corresponds broadly to the second embodiment except in the derivation of the control signal for effecting switching, and that the control signal differs from channel to channel.

As before, red, green and blue transmission signals are obtained from photomultipliers and logarithmic amplifiers (7, 8 and 9 in FIG. 1) and applied to a conventional electronic color mask 20. The matrixed signals therefrom are applied to a divider 21/22 which separates the red signal R, for example, into ΔR and ΔR', where ΔR is the signal corresponding to an optical density D between 0 and 2.4 of the scanned picture point of the transparency, and ΔR' corresponds to D above 2.4. Similarly the green signal G=ΔG+ΔG', and the blue signal B=ΔB+ΔB', these signals being divided at the same optical densities.

From the divider 22 the signal ΔR' is applied to the first auxiliary matrix unit 23 which in this case is not a unity matrix but a 0.75 multiplier. The output from matrix unit 23 is fed to a summing amplifier 24 together with the output ΔR of divider 21.

From the inputs and output of divider 21 the signals, for the red channel, ΔR+B+G are applied to the summing amplifier 25 whose output passes to divide-by-3 divider 26 and thence to a level dependent switch 27. Switch 27 operates when its input, (ΔR+G+B)/3, is greater than 2.4 and allows the excess over 2.4 to pass. For a neutral color where R+G+B, each greater than 2.4, then the output from switch 27 is (ΔG'+ΔB')/3.

Now required output from the red channel for a neutral input in embodiment 2 is shown by $$R' = \Delta R + 0.75 \Delta R' + 0.25 \Delta G' + 0.25 \Delta B',$$

and the output from switch 27 is therefore weighted by 0.25×3 to give the required coefficients for ΔG' and ΔB'. The 0.75 multiplier 28 produces as output, the positive part of $$0.75 \left( \frac{\Delta R + G + B}{3} - 2.4 \right)$$

and applies it to the summing amplifier 24.

Thus, for a neutral color, R=G=B>2.4, the output of summing amplifier 24 is $$R' = \Delta R + 0.75 \Delta R' + .75 H \left( \frac{\Delta R + G + B}{3} - 2.4 \right),$$

where H is the positive part.

For lighter or more saturated colors, the signal $$\frac{\Delta R + G + B}{3} < 2.4,$$

and there will be no output from switch 27. The output from summing amplifier 24 is then $R' = \Delta R + 0.75\ R'$.

In this fourth embodiment the desaturation or neutralization is effected more gradually. For example where the scanned picture spot is a red, G=B=3, desaturation commences when the red density exceeds 1.2 but does not reach its maximum until D is greater than 2.4.

The system may be represented in matrix form as follows:

$$\begin{bmatrix} R' \\ G' \\ B' \end{bmatrix} = \begin{bmatrix} \Delta R \\ \Delta G \\ \Delta B \end{bmatrix} + \begin{bmatrix} 0.75 & 0 & 0 \\ 0 & 0.75 & 0 \\ 0 & 0 & 0.75 \end{bmatrix} \begin{bmatrix} \Delta R' \\ \Delta G' \\ \Delta B' \end{bmatrix} + 0.75 H$$

$$\begin{bmatrix} \frac{\Delta R + G + B}{3} - 2.4 \\ \frac{R + \Delta G + B}{3} - 2.4 \\ \frac{R + G + \Delta B}{3} - 2.4 \end{bmatrix}$$

The fourth embodiment may be modified to provide some modelling, i.e. addition of details say to a saturated color print whose optical density exceeds 2.4, as in the third embodiment. A suitable matrix for this fifth embodiment is as follows:

$$\begin{bmatrix} R' \\ G' \\ B' \end{bmatrix} = \begin{bmatrix} \Delta R \\ \Delta G \\ \Delta B \end{bmatrix} + \begin{bmatrix} 0.75 & 0.06 & 0.06 \\ 0.06 & 0.75 & 0.06 \\ 0.06 & 0.06 & 0.75 \end{bmatrix} \begin{bmatrix} R' \\ G' \\ B' \end{bmatrix} +$$

$$0.5 H \begin{bmatrix} \frac{\Delta R + G + B}{3} - 2.4 \\ \frac{R + \Delta G + B}{3} - 2.4 \\ \frac{R + G + \Delta B}{3} - 2.4 \end{bmatrix}$$

In the above embodiments there are two auxiliary matrix units, one possibly being a unity matrix. The invention may alternatively include a larger number of matrices, particularly where reversal films with large non-linear interimage effects are involved. The appropriate matrix would then be switched in accordance to the density or saturation of each scanned picture point of the film.

The preceding embodiments have been concerned with film scanners but it will be appreciated that the invention is applicable to television cameras. Thus the first embodiment can be applied to such a camera so that in the subsequent television display the dark image areas are reproduced nearer neutral and yet saturated colors are unaffected by this compensation. Further, since television system have a sharp toe to their transfer characteristics, saturated colors are often reproduced with little detail in them. The addition of weak matrixing (matrixing using small but non-zero off-diagonal terms) in all of the three channels, using the technique adopted for the third and fourth embodiments will then compensate for this effect.

As indicated above, the invention is useful where there is a high optical density at a scanned picture point. It should be appreciated that the undesirable effects which can be compensated for by use of the invention, where the film, slide or direct image information is at a high density, or includes shading errors, or mismatches arising in electronic circuits such as logarithmic amplifiers, or mismatch in the scanned film.

What is claimed is:

1. For use with a device for scanning a image, point-by-point, and in response thereto for producing a set of color video signals, the level of any given signal thereof representing the density or brightness of the respective color of the image at the point being scanned, a matrix compensator for modifying the color video signals, comprising:

(a) matrix means, capable of providing at least first and second matrixing effects, for receiving the color video signals and for modifying these signals, said auxiliary matrix means being effective when providing said first matrixing effect to shift said color video signals toward a representation of neutral density; and (b) switch means responsive to the levels of the color signal(s) for selectively controlling, point-by-point, the matrixing effect provided by said auxiliary matrix means.

2. The invention claimed in claim 1, wherein: said auxiliary matrix means, when providing said second matrixing effect leaves said color video signals substantially unchanged.

3. The invention claimed in claim 1, wherein: said auxiliary matrix means, when providing said second matrixing effect is effective to provide detail enhancement to areas of highly saturated color.

4. The invention claimed in claim 1 wherein: said matrix means is capable of providing a continuously variable range of matrixing effects between said first and second matrixing effects, and wherein said switch means selectively controls the matrixing effect within said range.

5. The invention claimed in claim 1, wherein: said switch means is adapted to cause said matrix means to provide said first matrixing effect in response to the absolute levels of said signals simultaneously exceeding a predetermined threshold.

6. The invention claimed in claim 1, further comprising:

(a) means for dividing each of the color video signals into upper and lower level parts, based on a predetermined threshold, to form sets of upper and lower signal parts, and for applying one set of said signal parts to said matrix means; and (b) means for recombining said upper and lower sets of signal parts after said one set of signal parts has been modified by said matrix means.

7. The invention claimed in claim 6, wherein: said switch means is responsive to the levels of the set of signal parts other than said one set.

8. The invention claimed in claim 7, wherein: said set of upper signal parts is supplied to said matrix means; said set of lower signal parts is supplied to said switching means; and said switching means is adapted to cause said matrix means to provide said first matrixing effect in response to the sum of said set of lower signal parts exceeding a predetermined threshold.

9. In a device for scanning a color image, point by point, and in response thereto for producing a set of color video signals, the level of any given signal thereof representing the density or brightness of the respective color of the image at the point being scanned, such device having a color masking matrix for modifying such color signals, an auxiliary matrix compensator for further modifying the color signals, comprising:

(a) means for dividing each of the modified color signals from the color masking matrix into upper and lower parts, the upper parts representing signal levels greater than a predetermined level and the lower parts representing signal levels less than the predetermined level;

(b) auxiliary matrix means having at least first and second auxiliary matrix units for receiving the upper parts of said signals and for further modifying them in a predetermined manner, said first auxiliary matrix unit having substantially large off-diagonal elements for shifting said upper signal parts toward a representation of neutral density, said second auxiliary matrix unit being a substantially diagonal matrix;

(c) selector switch means, responsive to a control signal, for selecting the output of either said first or said second auxiliary matrix unit;

(d) control signal generating means, responsive to said lower signal parts for generating, point by point, said control signal; and (e) summing means for summing respective lower signal parts with the corresponding modified upper signal parts to produce the set of further modified color video signals.

10. The invention claimed in claim 9, wherein:

(a) said color image is produced from a color transparency;

(b) said predetermined signal level represents a transmission density of approximately 2.4;

(c) said first auxiliary matrix unit is a substantially symmetrical matrix having diagonal elements of approximately 0.5 and off-diagonal elements of approximately 0.25;

(d) said second auxiliary matrix unit is a unit matrix; and (e) said selector switch means is effective: to select the output of said first auxiliary matrix unit when the sum of said lower signal parts, divided by three, is greater than or equal to 2.2, and to select the output of said second auxiliary matrix unit when said sum of said lower signal parts, divided by three, is less than 2.2.

11. The invention claimed in claim 9, wherein: said first and second auxiliary matrix units share the same diagonal elements, and said selector switch means is effective to switch between first and second sets of off-diagonal elements.

12. In a device for scanning a color image, point by point, and in response thereto for producing a set of color video signals, the level of any given signal thereof representing the density or brightness of the respective color of the image at the point being scanned, such device having a color masking matrix for modifying such color signals, an auxiliary matrix compensator for further modifying the color signals, comprising:

(a) means for dividing each of the modified color signals from the color masking matrix into upper and lower parts, the upper parts representing signal levels greater than a predetermined level and the lower parts representing signal levels less than the predetermined level;

(b) a first auxiliary matrix unit adapted to receive said upper signal parts and to produce a modified set of upper signal parts, said first auxiliary matrix unit being a substantially diagonal matrix;

(c) a second auxiliary matrix unit adapted to receive said lower signal parts and said modified color signals from said color masking matrix and to produce therefrom a set of point-by-point correction signals, one correction signal corresponding to each color video signal, said correction signals being effective, when added to said upper and lower signal parts, to shift said video signals toward a representation of neutral density; and (e) means for summing a lower signal part, a corresponding modified upper signal part, and a corresponding correction signal to produce a further modified color signal.

13. The invention claimed in claim 12, wherein:

(a) said color image is produced from a color transparency;

(b) said predetermined signal level represents a transmission density of approximately 2.4;

(c) the diagonal elements of said first auxiliary matrix unit are approximately 0.75 and the off-diagonal elements are substantially small;

(d) the correction signals produced by said second auxiliary matrix unit are equal to 0.75 times the lower part of the corresponding modified color signal plus the other modified color signals divided by three minus 2.4.

14. The invention claimed in claim 13, wherein: said off-diagonal elements of said first auxiliary matrix unit are zero.

15. The invention claimed in claim 13, wherein: said off-diagonal elements of said first auxiliary matrix unit are approximately 0.06 to provide added detail to the color video signals in areas of saturated color.

* * * * *